United States Patent
Aida et al.

(10) Patent No.: US 8,340,624 B2
(45) Date of Patent: Dec. 25, 2012

(54) RECEIVER CIRCUIT ADAPTED TO COMMUNICATION APPARATUSES OPERATIVE WITH DIFFERENT POWER VOLTAGE RANGE

(75) Inventors: Ken Aida, Kariya (JP); Tomohisa Kishigami, Obu (JP)

(73) Assignee: Denso Corporation, Kariya (JP)

( * ) Notice: Subject to any disclaimer, the term of this patent is extended or adjusted under 35 U.S.C. 154(b) by 165 days.

(21) Appl. No.: 12/927,930

(22) Filed: Nov. 30, 2010

(65) Prior Publication Data

US 2011/0130110 A1 Jun. 2, 2011

(30) Foreign Application Priority Data

Dec. 2, 2009 (JP) ................................. 2009-274593

(51) Int. Cl.
*H04B 1/16* (2006.01)
(52) U.S. Cl. ...................... 455/343.1; 455/572; 455/130; 455/343.2; 455/343.5; 318/812; 318/400.03; 318/400.09; 180/65.21; 180/65.275; 180/65.285
(58) Field of Classification Search .................. 455/572, 455/130, 343.1, 343.2, 343.5, 344, 345; 318/812, 318/400.03, 400.09; 180/65.21, 65.275, 180/65.285
See application file for complete search history.

(56) References Cited

U.S. PATENT DOCUMENTS

| 4,334,426 | A | * | 6/1982 | Kita et al. ................... 73/114.35 |
| 2005/0267659 | A1 | | 12/2005 | Sunaga et al. |
| 2009/0029656 | A1 | * | 1/2009 | Sicard ............................. 455/91 |
| 2009/0267574 | A1 | * | 10/2009 | Olson ........................... 323/234 |
| 2010/0030412 | A1 | * | 2/2010 | Mitsutani ........................ 701/22 |

FOREIGN PATENT DOCUMENTS

| JP | 2005-335607 | 12/2005 |
| JP | 2009-526451 | 7/2009 |

* cited by examiner

*Primary Examiner* — Tuan Pham
(74) *Attorney, Agent, or Firm* — Harness, Dickey & Pierce, PLC (57) ABSTRACT

A LIN receiver includes a voltage divider that divides an input voltage and outputs the divided voltage, and a peak hold circuit that outputs a peak voltage of the input voltage. The LIN receiver is configured to generate a threshold voltage to be used for determining a voltage signal of a communication bus. The threshold voltage is generated from a voltage signal of the communication bus such that the peak value of the voltage signal (i.e., equivalent to a battery voltage) is held by the peak hold circuit and divided by the voltage divider. Although the communication bus is connected to an on-vehicle battery of which voltage varies with time, by using the voltage signal of the communication bus, a 5V system ECU can generate a threshold voltage which varies responding to the variation of the battery voltage. Hence, the voltage signal can be determined correctly as either high or low level.

18 Claims, 7 Drawing Sheets

RECEIVER CIRCUIT ADAPTED TO COMMUNICATION APPARATUSES OPERATIVE WITH DIFFERENT POWER VOLTAGE RANGE

CROSS REFERENCE TO RELATED APPLICATION

This application is based on and claims the benefit of priority from earlier Japanese Patent Application No. 2009-274593 filed on Dec. 2, 2009, the description of which is incorporated herein by reference.

BACKGROUND OF THE INVENTION

1. Field of the Invention

The present invention relates to a receiver circuit used for a communication apparatus, more particularly to a receiver circuit adapted to communication apparatuses operative with different power voltage ranges.

2. Description of the Related Art

Conventionally, a vehicle control system adopts a communication system in which a plurality of communication apparatuses connected each other via communication line. In the communication system, a communication data is exchangeable among the communication apparatuses via the communication line. The communication data received or transmitted via the communication line is a voltage signal generated from a direct current (referred to DC) power source of which output voltage may vary.

Specifically, vehicles implement various ECUs (electronic control units) mutually connected via a communication bus as a communication line, which configures the communication system in the vehicle. This configuration is commonly used for a vehicle communication system. Specifically, Japanese Patent Application Laid-Open Publication No. 2005-335607 and 2009-526451 disclose a communication system in which the communication is performed by using a two states voltage signal, consisting of high level referenced to an output voltage of a battery mounted on the vehicle, and low level referenced to the ground potential (GND=0V).

In the above-described communication system adapted to the vehicle communication system, respective ECUs recognize either high or low level on the communication bus based on a threshold voltage. Generally, the ECUs mounted on the vehicle are adapted to operate with power supplied by the on-vehicle battery, i.e., battery voltage is supplied to the ECUs. Therefore, the threshold voltage can be generated by a voltage divided from the battery voltage. Specifically, a comparator is used to compare the voltage signal from the communication bus with a voltage divided from the battery voltage Vbat, the voltage being divided into one half of the battery voltage Vbat with two resistors having the same resistor value. Hence, the comparator outputs a two state signal as a reception signal based on the voltage signal on the communication bus.

Alternatively, one of ECUs mounted on the vehicle may be supplied a constant voltage generated by a constant voltage source as a power supply instead of the battery. Assuming this type of ECU exists in the communication system mixed with the ECUs using the battery as a power source, it is possible that stable communication may be disrupted.

Figure 1:
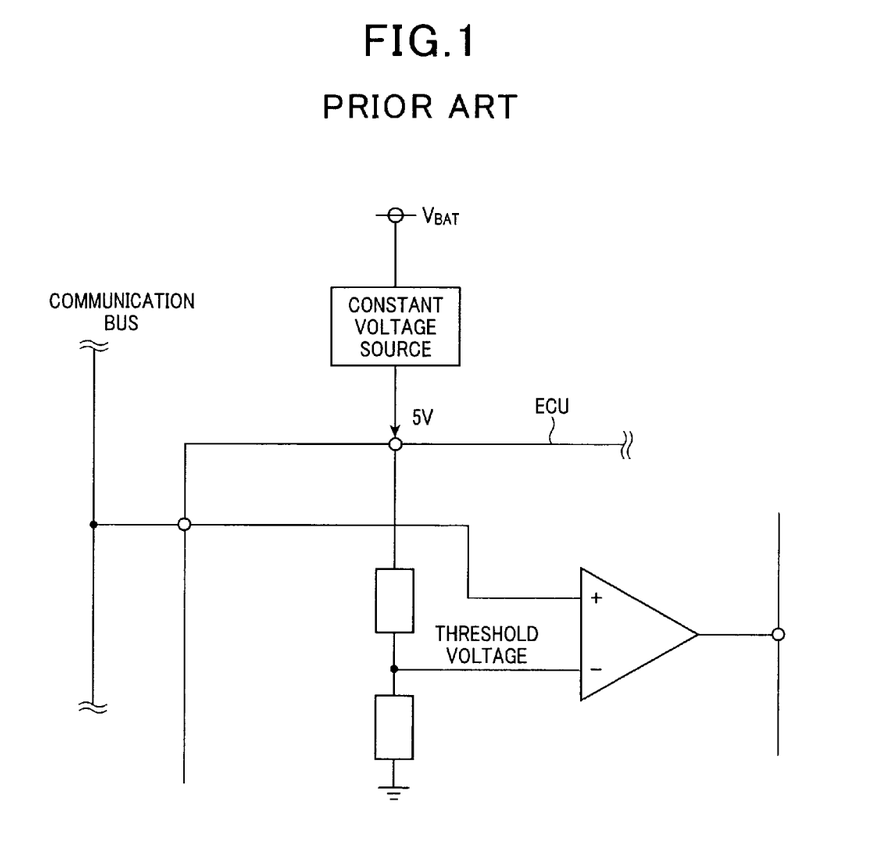
FIG. 1 is a block diagram showing a conventional configuration of a receiver.

Specifically, as shown in FIG. 1, the ECU is supplied with a constant voltage generated by a constant voltage source. The receiver is arranged in the ECU, which is configured as a voltage divider and a comparator. Thus, the ECU operated by the constant voltage as the power source uses the threshold voltage generated by dividing the constant voltage so that the threshold voltage is kept constant regardless of the variation of the battery voltage. As a result, when the variation of the battery becomes larger, the voltage signal of the communication bus cannot be determined correctly. For instance, when the specification of the communication bus is defined such that the bit '1' is defined as voltage equal to or more than 60% of the battery voltage, and the bit '0' is defined as voltage equal to or less than the battery voltage, if the battery voltage varies from 8V to 16V, the threshold value should be set to 3.2V to 4.8V when the battery voltage is 8V, and set to 6.4V to 9.6V when the battery voltage is 16V. Accordingly, a fixed value cannot be used as the threshold value.

The above-described problem occurs not only in a communication system which is mounted on the vehicle, but occurs in a communication system configured to generate the voltage signal used for the communication line, the voltage signal being generated from the DC power supply in which the output voltage varies.

SUMMARY

As a first aspect of the embodiment, a reception processing apparatus and a communication apparatus is provided which is adapted to the communication system in which the voltage signal used for the communication line is generated by the output voltage of a DC power source, the output voltage of the power source being variable. The apparatuses feature a configuration capable of correctly determining logical state of the voltage signal of the communication line.

Specifically, the first aspect of the embodiment includes: an input circuit connected to a communication bus, the communication bus being connected to a direct current (DC) power source that generates a voltage signal from an output voltage of the DC power source, the input circuit receiving a voltage signal from the communication bus; a processing circuit connected to the input circuit, processing the voltage signal received from the input circuit to generate a threshold voltage; and a converting circuit connected to the processing circuit, receiving the voltage signal from the communication bus, comparing the voltage signal with the threshold voltage generated by the processing circuit thereby converting the voltage signal into digital data having high and low voltage levels, wherein the processing circuit includes i) dividing section for dividing the voltage signal with a predetermined division ratio and ii) holding section for holding a peak value of the voltage signal.

According to this reception processing apparatus, by using the voltage signal of the communication bus, even a communication apparatus which is not adapted to use a DC power source can generate a suitably adapted threshold voltage despite the variation of the output voltage of the DC power source. As a result, the voltage signal of the communication bus can be determined as either high level or low level correctly.

Depending on configurations of the communication system, when noise or the like affects the voltage signal of the communication bus whereby the voltage signal significantly varies temporarily, the threshold voltage may be shifted significantly from the appropriate voltage level.

According to a second aspect of the embodiment, the processing circuit of the reception processing apparatus is configured to limit a maximum value of the voltage signal to be equal to or less than a predetermined value so as to limit the threshold voltage to be a predetermined voltage range.

Thus, in the reception processing apparatus configured as above, even if the voltage signal of the communication bus is affected by noise whereby the voltage signal varies temporarily, the threshold voltage is maintained to an appropriate voltage level.

Moreover, according to a third aspect of the embodiment, the processing circuit of the reception processing apparatus is configured to limit a minimum value of the voltage signal to be equal to or more than a predetermined value so as to limit the threshold voltage to be a predetermined voltage range. Therefore, the threshold voltage can be maintained to an appropriate voltage level even when the voltage signal of the communication bus continuously decreases for a long term period.

Meanwhile, according to a fourth aspect of the embodiment, the reception processing apparatus can be arranged in a communication apparatus which is mounted on a vehicle. In this configuration, the communication system is configured as a plurality of on-vehicle communication apparatuses and a battery mounted on the vehicle is used for the DC power source in the communication system.

As a fifth aspect of the embodiment, the communication apparatus can be provided with either one of reception apparatuses as set fourth above.

DESCRIPTION OF THE PREFERRED EMBODIMENTS

Figure 2:
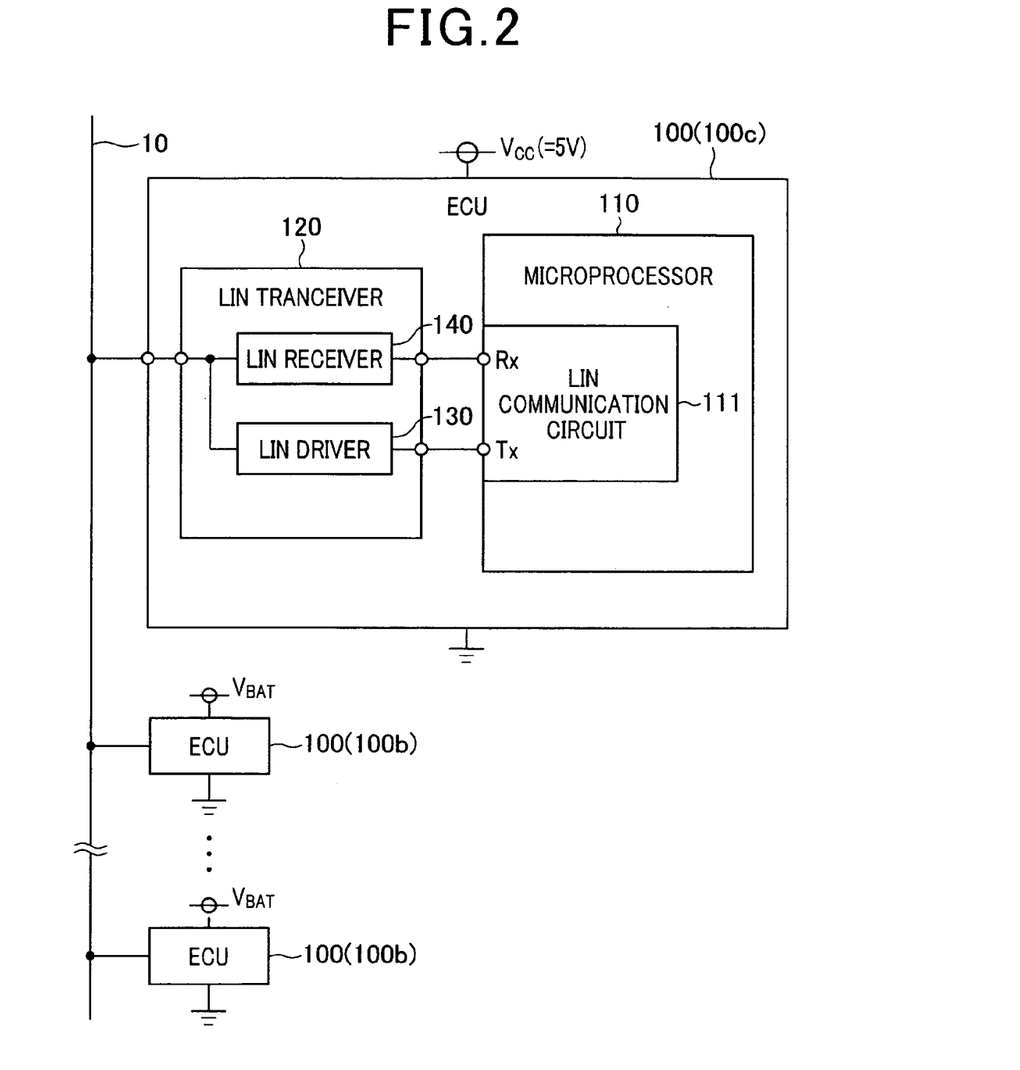
FIG. 2 is a block diagram showing an overall configuration of a communication system according to an embodiment.

With reference to FIGS. 2 to 6A and 6B, hereinafter will be described an embodiment of the present invention. FIG. 2 is a block diagram showing an overall configuration of the communication system according to the embodiments.

As shown in FIG. 2, a plurality of ECUs (electronic control unit) 100, mounted on a vehicle, are connected each other via a communication bus 10 to configure the communication system. Each ECU100 serves as a communication apparatus (communication node). In the communication system, the communication is performed based on the well-known communication protocol LIN (also known as Local Interconnect Network).

The vehicle equipped with this communication system includes a battery rated 12V output (not shown) as a DC (direct current) power source, a constant voltage source (not shown) that generates 5V constant voltage Vcc from the output voltage (hereinafter referred to battery voltage) Vbat of the battery. A plurality of ECU100s that constitute the communication system, comprises a 12V-system ECU100b in which the battery voltage Vbat is applied and a 5V-system ECU100c in which the constant voltage Vcc generated by the constant voltage source is applied (battery voltage Vbat is not applied to the ECU100c). The constant voltage source may be arranged as a dedicated circuit (unit). However, specific ECU100 can be designed to provide a constant voltage source.

Next, a configuration commonly used for respective ECU100s (i.e., 12V-system ECU100b and 5V-system ECU100c) is described as follows.

As shown FIG. 2, the ECU100 includes a microprocessor 110 having a LIN communication circuit 111, and a LIN transceiver 120 having a LIN driver (transmission circuit) 130 and a LIN receiver (reception circuit) 140.

The microprocessor 110 has Rx terminal and Tx terminal as communication terminals. Each terminal is connected to the communication terminal of the LIN transceiver 120. Note that the LIN communication circuit 111 can be designed as either hardware in the microprocessor 110 or software. Further, the LIN communication circuit can be designed as both hardware and software.

The LIN transceiver 120 serves as an interface circuit between the bus 10 and the microprocessor 110. The LIN transceiver is configured as an integrated circuit. The voltage of the bus 10 is pulled up to the battery voltage Vbat (high level) and becomes low level when the bus 10 is shorted to the ground potential (GND=0V) by the LIN driver 130 of the LIN transceiver 120. In other word, the LIN transceiver 120 transmits and receives two state voltage signal (communication signal) via the bus 10 which is defined such that the battery voltage Vbat is defined as high level (recessive) and the ground potential is defined as low level (dominant).

Figure 3:
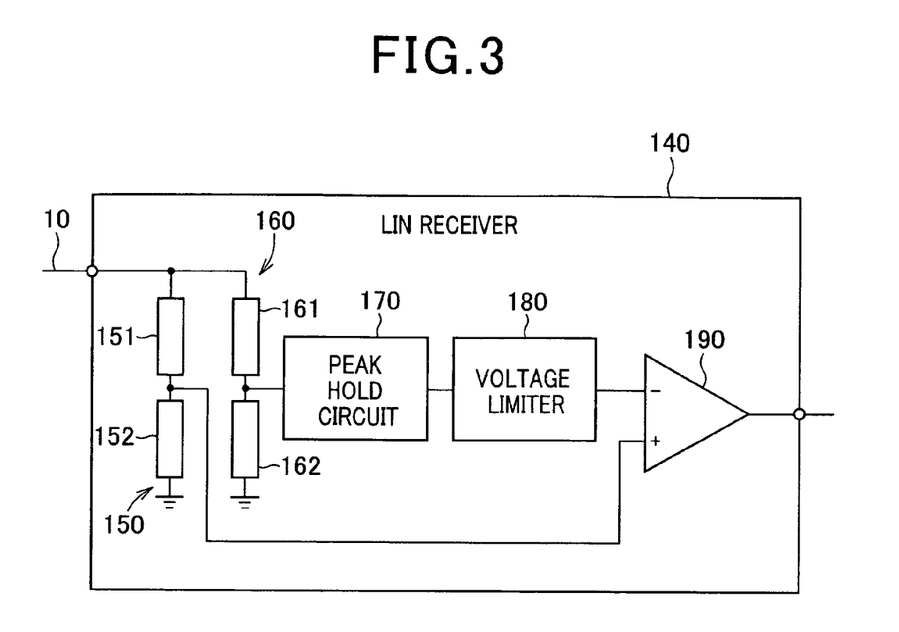
FIG. 3 is a block diagram showing a configuration of a LIN (local interconnect network) receiver.

Moreover, the ECU100 includes a power circuit (not shown) configured to distribute power to each circuit block in the ECU100. The power is supplied by an external source (i.e., battery or constant voltage source). Next, a configuration of the LIN receiver 140 is described as follows. FIG. 3 is a block diagram showing the configuration of the LIN receiver 14.

The LIN receiver 140 includes a voltage divider circuit 150 consisting of resistors 151 and 152 connected in series between the bus 10 and the ground potential. The ratio of resistor values for the resistors 151 and 152 is set as 1:2 and voltage divided into two-thirds of the voltage signal of the bus 10 appears at the junction of the resistors 151 and 152.

Also, the LIN receiver 140 includes a voltage divider circuit 160 separately from the voltage divider 150, which consist of resistors 161 and 162 connected in series between the bus 10 and the ground potential. The ratio of resistor values for the resistors 161 and 162 is set as 2:1 and voltage divided into one-thirds of the voltage signal of the bus 10 appears at the junction between the resistors 161 and 162.

Figure 4:
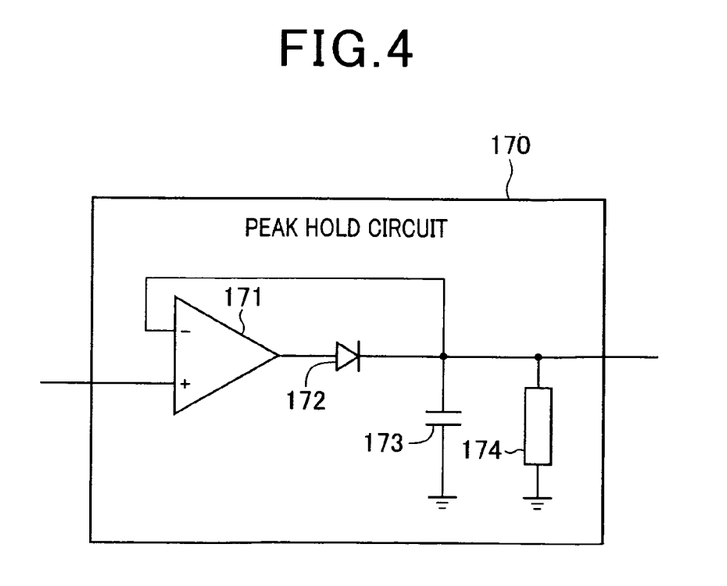
FIG. 4 is a block diagram showing a peak hold circuit configuration.

Moreover, the LIN receiver 140 inputs the voltage signal divided by the voltage divider 160 (i.e., voltage at junction between the resistors 161 and 162) and includes a peak hold circuit 170 that outputs a voltage corresponding to a peak voltage of the input voltage signal. The circuit configuration of the peak hold circuit 170 may be a well-known circuit. Specifically, as shown in FIG. 4, an operational amplifier (op-amp) 171, a diode 172, a capacitor 173 and a resistor 174 are adapted to be the peak hold circuit 170. Since FIG. 4 is a block diagram showing the principle of the peak hold circuit, detail configuration of the peak hold circuit includes a buffer to receive the output as high impedance and a circuit used to reset the capacitor.

Figure 5:
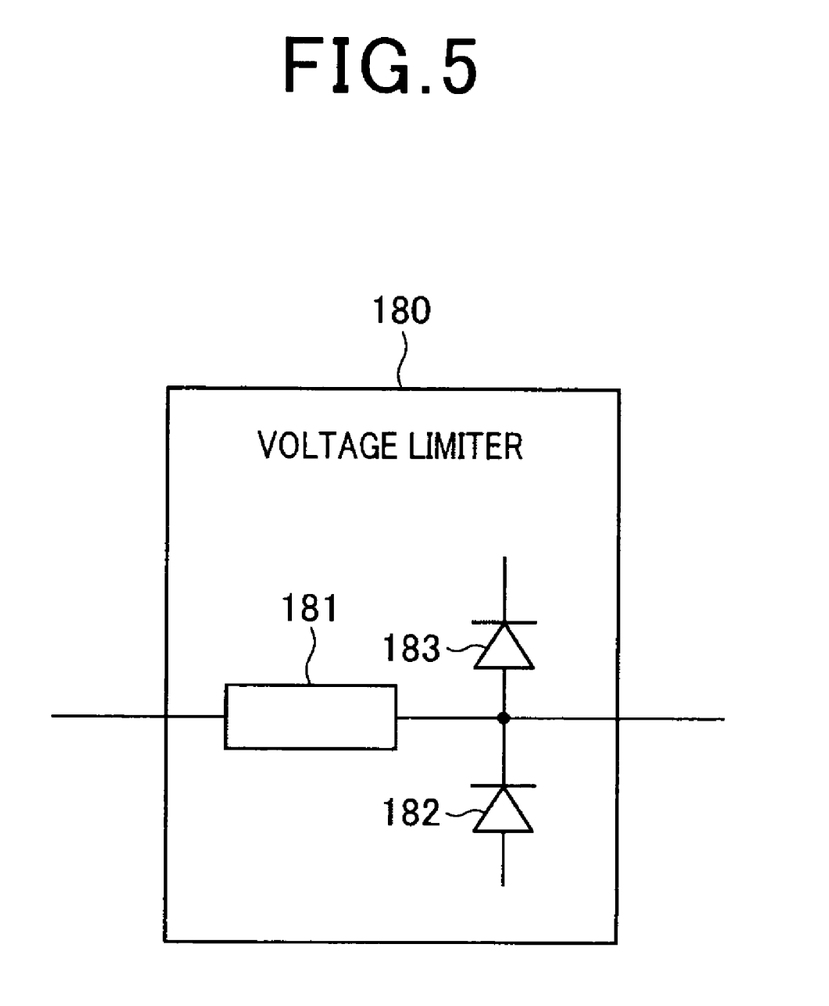
FIG. 5 is a block diagram showing a configuration of a voltage limiter.

Referring to FIG. 3, the LIN receiver 140 includes a voltage limiter 180 that limits the output voltage of the peak hold circuit 170 to be a predetermined voltage range defined by predetermined minimum and maximum values (In this embodiment, the predetermined range is defined by the communication standard). Also, the circuit configuration of the voltage limiter 180 may be a well-known circuit. Specifically, as shown in FIG. 5, the voltage limiter 180 can be configured by using the resistor 181 and the diodes 182 and 183.

As shown in FIG. 3, the LIN receiver 140 includes a comparator 190. The comparator 190 is configured such that a voltage signal divided by the voltage divider 150 (voltage at a junction between resistors 151 and 152) is connected to the non-inverting input terminal of the comparator 190 and the voltage outputted from the voltage limiter 180 is connected to the inverting input of the comparator 190. The comparator 190 compares both voltage signals and outputs two states reception signal (i.e., bit '1' or bit '0') based on the comparison result.

In the above-described LIN receiver 140, the voltage signal of the bus 10 (voltage signal referenced to the battery voltage Vbat: high level is defined as the Vbat potential and the low level is defined as the ground potential) is divided into two-third of the voltage signal level at the voltage divider 150 and inputted to the non-inverting input of the comparator 190. Meanwhile, at the voltage divider 160, the voltage signal of the bus 10 is divided into one-third of the voltage signal level and the peak value of the divided signal (i.e., the voltage signal is divided down to one third of the battery voltage, i.e., to Vbat/3) is held at the peak hold circuit 170. After that, the voltage signal is inputted to the inverting input of the comparator 190 via the voltage limiter 180. Specifically, as a threshold voltage (reference voltage) used to determine whether the voltage signal of the bus 10 is high or low, a voltage of which level is one-half of the voltage signal at the non-inverting input (a voltage equal to one-thirds of the battery voltage Vbat), is generated. The threshold voltage generated by this circuit configuration varies depending on the variation of the battery voltage Vbat as well as the voltage signal divided from the battery voltage Vbat.

The comparator 190 is configured to determine whether the voltage signal of the bus 10 is high or low level based on the threshold voltage. In more detail, the voltage signal at the non-inverting input of the comparator 190, which is being divided into two-thirds of the voltage signal at the bus 10 and the threshold voltage at the inverting input of the comparator 190, are compared by the comparator 190. As a comparison result, the comparator 190 outputs the two state reception signal. The reception signal is inputted to the Rx terminal of the microprocessor 110.

The voltage limiter 180 is used to avoid the output voltage of the peak hold circuit 170 exceeding a normal voltage range (i.e., around the voltage divided into one-third of the battery voltage Vbat). Depending on configurations of the communication system, the peak hold circuit 170 may suffer from unwanted noise being superimposed to the input voltage, whereby the output voltage of the peak hold circuit exceeds a regular voltage range specified by the communication standard. According to the embodiment, since the voltage limiter 180 can limit the threshold voltage to be within the regular voltage range which is specified by the communication standard.

Figures 6A, 6B:
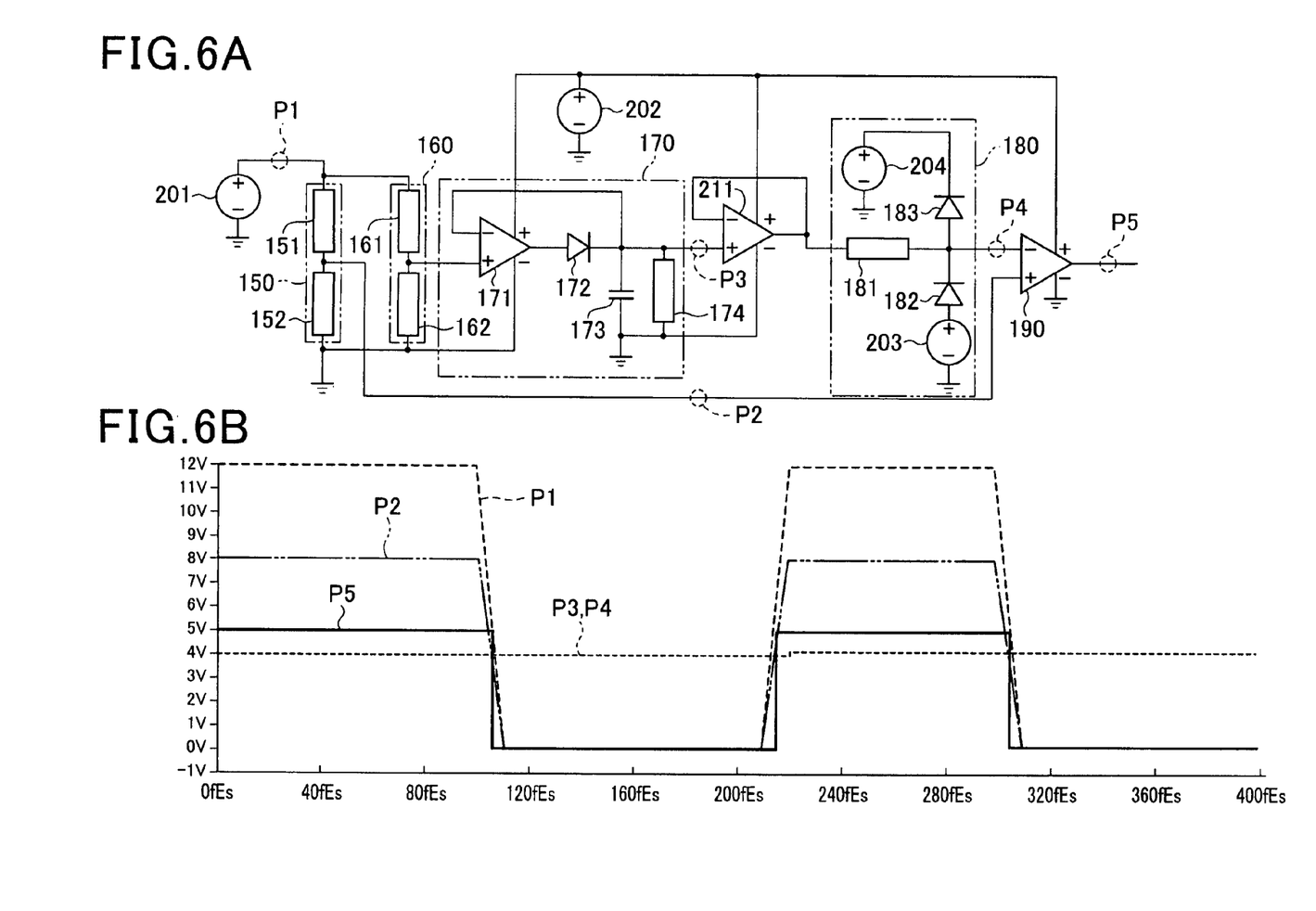
FIG. 6A is a circuit diagram adapted for simulating the LIN receiver.
FIG. 6B is an explanatory diagram showing a simulation result regarding the LIN receiver.

FIG. 6A illustrates a circuit configuration adapted for simulating the LIN transceiver 140. It is noted that detail explanations for the voltage divider 150 and 160, the peak hold circuit 170, the voltage limiter 180 and the comparator 190 are omitted.

The circuit configuration for the simulation includes a pulse voltage generator 201 that generates pulse voltage of which voltage level corresponds to the voltage signal of the bus 10 (i.e., 0V/12V), a constant voltage generation circuit 202 that generates 5V constant voltage, a constant voltage generation circuit 203 that generates 2.5V constant voltage and a constant voltage generation circuit 204 that generates 10.3V constant voltage.

The pulse voltage generated by the pulse voltage generator 201 is divided by the voltage divider 150 and 160. The resistor values of the resistors 151 and 152 that constitute the voltage divider 150 are set to 10K ohm and 20K ohm respectively. Similarly, the resistor values of the resistors 161 and 162 that constitute the voltage divider 160 are set to 20K ohm and 10K ohm respectively The constant voltage 5V generated by the constant voltage generation circuit 202 is applied to the op-amps 171, 211 and the comparator 190. In the circuit configuration for the simulation, the op-amp 211 operates as a voltage follower circuit.

Meanwhile, the constant voltage generation circuit 203 and 204 are arranged in order to set the predetermined minimum and maximum values used for the voltage limit circuit 180. Specifically, when the communication standard specifies that bit '0' is specified as equal to or more than 60% of the battery voltage and bit '1' is specified as equal to or less than 40% of the battery voltage, assuming the battery voltage Vbat varies from 8V to 16V, a voltage less than 40% of the battery voltage when the Vbat is 8V (i.e., 8V×0.4=3.2V) is unsuitable as a threshold voltage. Also, when the battery voltage is 16V, a voltage more than 60% of the battery voltage (i.e., 16V× 0.6=9.6V) cannot be used for the threshold voltage because of the same reason. Hence, the voltage limit circuit 180 limits the voltage range to be 3.2V to 9.6V. Considering the forward voltage of the diodes 182 and 183, the constant voltage generation circuit 203 generates a constant voltage 2.5V (=3.2− 0.7) as a lower limit voltage and the constant voltage generation circuit 204 generates a constant voltage 10.3V (=9.6+ 0.7) as an upper limit voltage.

FIG. 6B is a diagram showing a voltage change with time simulated in the simulation circuit of FIG. 6A. As shown in FIG. 6B, P1 indicates the output voltage of the pulse voltage generator 201, P2 indicates the output voltage of the voltage divider 150, P3 indicates the output voltage of the peak hold circuit 170, P4 indicates the output voltage of the voltage limiter 180 (i.e., threshold voltage), and the P5 indicates the output voltage of the comparator 190. According to the simulation result, it is confirmed that the voltage divider 160 and the peak hold circuit 170 generate the threshold voltage at P4 to be a voltage showing the middle level of the output voltage swing at P2 of the voltage divider 150.

To confirm effects of the voltage limiter 180, another simulation is performed assuming noise superimposed on the voltage signal of the bus 10. Note that illustration is omitted for this simulation. Specifically, when making a rapid voltage change on the output P1 of the pulse voltage generator 201, the output voltage of the peak hold circuit 170 increases, nevertheless, the output voltage was limited to the specified voltage range. As a result, even if the noise is superimposed to the bus 10, fluctuation of the threshold voltage can be avoided.

As described above, in the communication system according to the embodiment, the LIN receiver disposed in the ECU100 includes the voltage divider 160 that divides the input voltage and outputs the divided voltage and the peak hold circuit 170 that holds the peak value of the input voltage and outputs the peak voltage. The LIN receiver 140 inputs the voltage signal from the bus 10 and output the voltage signal via the voltage divider 160 and the peak hold circuit 170 whereby the threshold voltage is generated such that the peak voltage of the voltage signal of the bus 10 (battery voltage: Vbat) is divided to generate the threshold voltage. Accordingly, by using the voltage signal of the bus 10, even 5V-system ECUs in which the battery voltage Vbat is not applied thereto, can generate the threshold voltage that varies depending on the variation of the battery voltage Vbat. Therefore, the voltage signal of the bus 10 can be correctly recognized as either high or low level.

Here, the peak hold circuit 170 is not an ideal circuit that can hold the peak voltage permanently. Hence, when the input voltage is less than the output voltage and if its state continues, the output voltage gradually decreases. In this regard, since the variation of the battery voltage is gradual, when the battery voltage Vbat varies to be decreased, the threshold voltage decreases in response to the variation of the battery voltage Vbat.

Further, the LIN receiver 140 includes the voltage limiter 180 adapted to limit the maximum value of the voltage to be predetermined value or less, and to limit the minimum value of the voltage to be predetermined value or more thereby limiting the threshold voltage to be predetermined voltage range. Accordingly, even if the bus 10 is affected by noise or the like so that the voltage signal of the bus 10 greatly increases temporarily, the LIN receiver 140 can avoid the generated threshold voltage being shifted from the appropriate voltage level. In addition, even when the voltage signal of the bus 10 continuously decreases for a long term period, the threshold voltage can be maintained to appropriate voltage level so that the threshold voltage level being greatly shifted from the appropriate voltage level can be avoided.

The communication system according to the embodiment, the ECU100 corresponds to a communication apparatus, the LIN receiver 140 corresponds to a reception processing apparatus, the voltage divider 160 and the peak hold circuit 170 correspond to the input circuit depending on the configurations in the LIN receiver. Also, the voltage divider 160 and the peak hold circuit 170 can be the processing circuit depending on the configurations. The comparator 190 corresponds to the converting circuit and the voltage limiter 180 correspond to processing circuit as well.

(Other Embodiments)

An embodiment of the present invention has been described above. The present invention however is not limited to the embodiment described above, but can be implemented in various modes as provided below.

In the above-described embodiment, the ratio of the resistor values in the voltage dividers 150 and 160 is set as 1:2, 2:1 respectively. These ratios are set to generate the threshold voltage to be a center of the voltage swing of the voltage signal inputted to the non-inverting input terminal (+ terminal) of the comparator 190. Considering the communication spec, setting the threshold to be the middle level of the voltage range, is preferably used in the communication system. However, since the above ratios are a practical example, any other ratios can be used for the communication system. Accordingly, setting the threshold voltage to be the right middle of the voltage swing of the voltage signal is not necessary.

In the above-described embodiment, the LIN receiver 140 using the voltage divider 150 to divide the voltage signal of the bus 10 is exemplified, however, the voltage divider 150 can be omitted. In this case, the resistor ratio of the voltage divider 160 is preferably set to 1:1.

Figure 7A:
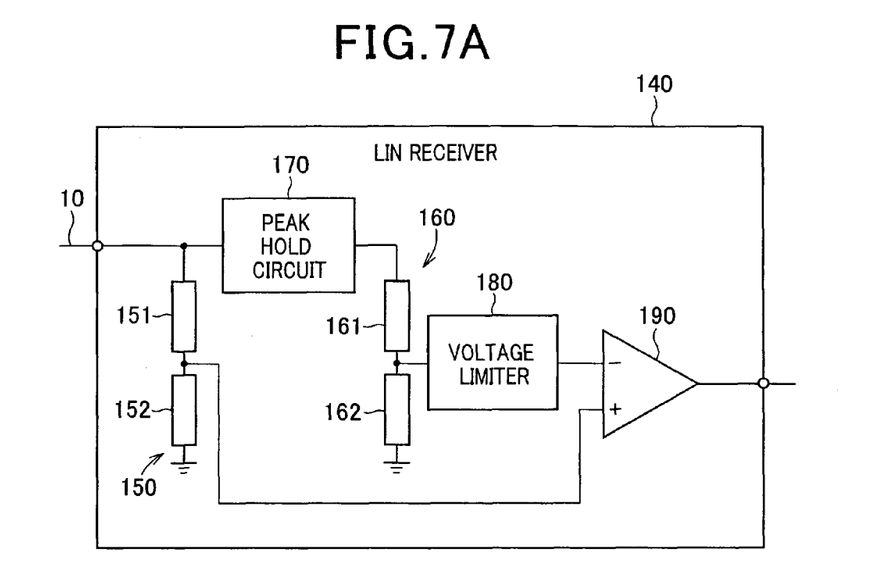
FIGS. 7A and 7B are explanatory diagram showing a configuration of the LIN receiver as a modification.
Figure 7B:
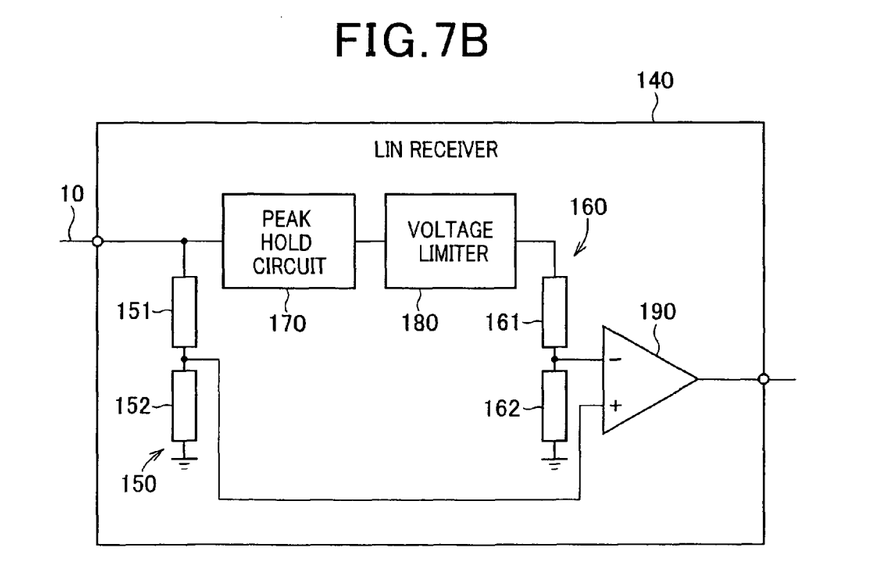

In the embodiment, the LIN receiver 140 is configured such that the voltage divider 160 is arranged at a position before the voltage is inputted to the peak hold circuit 170 so that the voltage signal is divided prior to the peak voltage of the voltage signal being held by the peak hold circuit 170. However, the present invention is not limited to this configuration. As shown in FIG. 7A, the voltage divider 160 can be arranged to divide the output voltage of the peak hold circuit 170. In other words, the voltage divider 160 can be disposed between the peak hold circuit 170 and the voltage limiter 180. Moreover, as shown in FIG. 7B, the voltage limiter 180 is arranged at a position after the voltage signal is outputted from the peak hold circuit 170 and the voltage divider 160 is arranged to divide the voltage signal outputted from the voltage limiter 180.

Figure 8A:
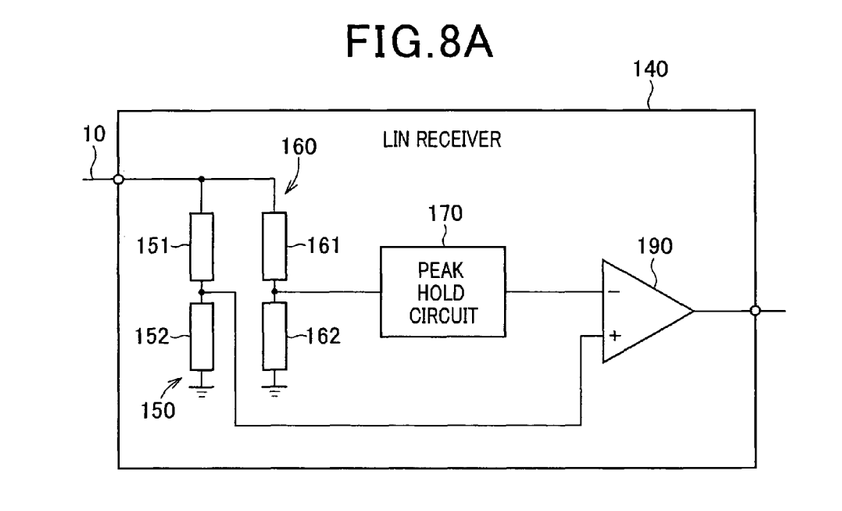
FIGS. 8A and 8B are explanatory diagram showing a configuration of the LIN receiver excluding a voltage limiter as a modification.
Figure 8B:
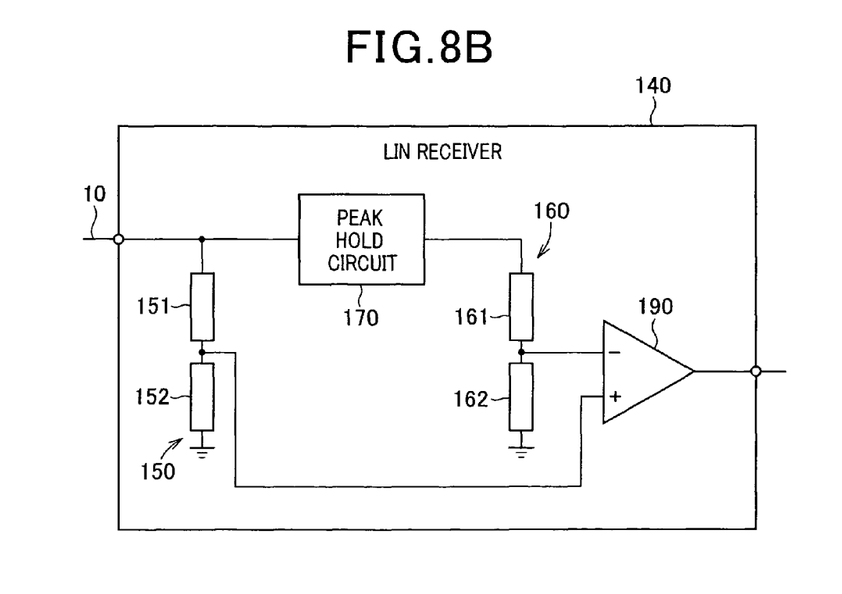

In the embodiment described above, the LIN receiver 140 is configured to include the voltage limiter 180, however, the LIN receiver 140 is not limited to this configuration. The LIN receiver 140 can be adapted to exclude the voltage limiter 180. Specifically, as shown in FIG. 8A, a configuration that the voltage divider 160 divides the voltage signal before inputting to the peak hold circuit 170 (a configuration in which the voltage divider 160 is disposed at a position before the peak hold circuit 170) can be used for the LIN receiver 140. Further, as shown in FIG. 8B, a configuration that the voltage divider 160 divides the voltage signal outputted by the peak hold circuit 170 can be adapted to the LIN receiver 140.

Meanwhile, according to the above-described embodiments, both the 5V-system ECU100*c* and the 12V-system ECU100*b* are configured to generate the threshold voltage by using the voltage signal inputted from the bus 10. However, the communication system is not limited this configuration. For example, as to the 12V-system ECU, like a configuration of the conventional type communication system, the ECU can be adapted to generate the threshold voltage by using the battery voltage Vbat.

Moreover, in the above-described embodiments, LIN as a communication protocol adapted to the communication system is exemplified. However, for example, the communication protocol specified by the ISO9141 standard can be adapted to the present invention.

What is claimed is:

1. A reception processing apparatus disposed in a first communication apparatus, the first communication apparatus being electrically connected to a second communication apparatus via a communication bus so as to constitute a communication system where digital data is communicable between the first communication apparatus and the second communication apparatus via the communication bus, the first communication apparatus being powered by a constant voltage source of which output voltage being constant with time and the second communication apparatus being powered by a direct current (DC) power source of which output voltage varies with time, the reception processing apparatus comprising:

an input circuit connected to the communication bus,
  the communication bus being electrically connected to the DC power source to be pulled up to the output voltage thereof, whereby a voltage signal at the communication bus is generated from the DC power source, the input circuit receiving the voltage signal from the communication bus;
  a processing circuit connected to the input circuit, processing the voltage signal received from the input circuit to generate a threshold voltage; and
  a converting circuit connected to the processing circuit, receiving the voltage signal from the communication bus, comparing the voltage signal with the threshold voltage generated by the processing circuit thereby converting the voltage signal into the digital data having high and low voltage levels, wherein the processing circuit includes i) dividing section for dividing the voltage signal with a predetermined division ratio and ii) holding section for holding a peak value of the voltage signal.

2. The reception processing apparatus according to claim 1, wherein the processing circuit further includes iii) limiting section for limiting a maximum value of the voltage signal to be equal to or less than a predetermined value so as to limit the threshold voltage to be a predetermined voltage range.

3. The reception processing apparatus according to claim 2, wherein the processing processed by the processing circuit is configured to limit a minimum value of the voltage signal to be equal to or more than a predetermined value so as to limit the threshold voltage to be a predetermined voltage range.

4. The reception processing apparatus according to claim 1, wherein the first and second communication apparatuses are mounted on a vehicle and the DC power source is a battery mounted on the vehicle.

5. A first communication apparatus including the reception processing apparatus according to claim 1.

6. A first communication apparatus including the reception processing apparatus according to claim 2.

7. A first communication apparatus including the reception processing apparatus according to claim 3.

8. A first communication apparatus including the reception processing apparatus according to claim 4.

9. The first communication apparatus including the reception processing apparatus according to claim 1, wherein the first communication apparatus and the second communication apparatus are communicable via the communication bus based on LIN communication protocol.

10. A communication system comprising:

a first communication apparatus powered by a constant voltage source of which output voltage is constant with time;

a second communication apparatus powered by a direct current (DC) power source of which voltage varies with time, the second communication apparatus electrically connected to the first communication apparatus via a communication bus, digital data being communicated between the first communication apparatus and the second communication apparatus via the communication bus;

a reception processing apparatus disposed in the first communication apparatus, the reception processing apparatus comprising:

an input circuit connected to the communication bus;

the communication bus being electrically connected to the DC power source to be pulled up to the output voltage thereof, whereby a voltage signal at the communication bus is generated from the DC power source, the input circuit receiving the voltage signal from the communication bus;

a processing circuit connected to the input circuit, processing the voltage signal received from the input circuit to generate a threshold voltage; and a converting circuit connected to the processing circuit, receiving the voltage signal from the communication bus, comparing the voltage signal with the threshold voltage generated by the processing circuit thereby converting the voltage signal into the digital data having high and low voltage levels, wherein the processing circuit includes i) dividing section for dividing the voltage signal with a predetermined division ratio and ii) holding section for holding a peak value of the voltage signal.

11. The communication system according to claim 10, wherein the processing circuit further includes iii) limiting section for limiting a maximum value of the voltage signal to be equal to or less than a predetermined value so as to limit the threshold voltage to be a predetermined voltage range.

12. The communication system according to claim 11, wherein the processing processed by the processing circuit is configured to limit a minimum value of the voltage signal to be equal to or more than a predetermined value so as to limit the threshold voltage to be a predetermined voltage range.

13. The communication system according to claim 10, wherein the first and second communication apparatus are mounted on a vehicle and the DC power source is a battery mounted on the vehicle.

14. A first communication apparatus including the reception processing apparatus according to claim 10.

15. A first communication apparatus including the reception processing apparatus according to claim 11.

16. A first communication apparatus including the reception processing apparatus according to claim 12.

17. A first communication apparatus including the reception processing apparatus according to claim 13.

18. The communication system including the reception processing apparatus according to claim 10, wherein the first communication apparatus and the second communication apparatus are communicable via the communication bus based on LIN communication protocol.

* * * * *